(12) United States Patent
Frigerio et al.

(10) Patent No.: US 9,315,411 B2
(45) Date of Patent: Apr. 19, 2016

(54) METHOD OF MANUFACTURING AN OPTICAL FIBRE GLASS PREFORM

(75) Inventors: Silvio Frigerio, Milan (IT); Ricardo Antunes de Camargo, Milan (IT); Lidia Terruzzi, Milan (IT)

(73) Assignee: PRYSMIAN S.P.A., Milan (IT)

( * ) Notice: Subject to any disclaimer, the term of this patent is extended or adjusted under 35 U.S.C. 154(b) by 78 days.

(21) Appl. No.: 13/996,941

(22) PCT Filed: Dec. 23, 2010

(86) PCT No.: PCT/EP2010/070648
§ 371 (c)(1),
(2), (4) Date: Jun. 21, 2013

(87) PCT Pub. No.: WO2012/084049
PCT Pub. Date: Jun. 28, 2012

(65) Prior Publication Data
US 2013/0291604 A1    Nov. 7, 2013

(51) Int. Cl.
*C03B 37/012*    (2006.01)
(52) U.S. Cl.
CPC ....... *C03B 37/01211* (2013.01); *C03B 37/0126* (2013.01); *C03B 37/01248* (2013.01); *C03B 2201/12* (2013.01); *Y02P 40/57* (2015.11)
(58) Field of Classification Search
CPC .................. C03B 37/01211; C03B 37/01225; C03B 37/01466; C03B 37/01248; C03B 2201/12
See application file for complete search history.

(56) References Cited

U.S. PATENT DOCUMENTS

| 4,596,589 | A | * | 6/1986 | Perry .............................. 65/412 |
| 4,820,322 | A | * | 4/1989 | Baumgart et al. .............. 65/412 |
| 4,846,867 | A | | 7/1989 | Yokota et al. |
| 5,356,449 | A | * | 10/1994 | Kuwahara et al. .............. 65/421 |

(Continued)

FOREIGN PATENT DOCUMENTS

| CN | 1380264 A | 11/2002 |
| CN | 1396131 A | 2/2003 |

(Continued)

OTHER PUBLICATIONS

ITU-T, G.657, "Characteristics of a Bending-Loss Insensitive Single Mode Optical Fibre and Cable for the Access Network," Recommendation ITU-T G.657, pp. i-iv and 1-13, (2009).

(Continued)

*Primary Examiner* — Lisa Herring
(74) *Attorney, Agent, or Firm* — Finnegan, Henderson, Farabow, Garrett & Dunner, L.L.P.

(57) ABSTRACT

A method of manufacturing an optical fiber preform includes: producing a core rod having a core rod diameter; inserting the core rod into a glass fluorine-doped intermediate cladding tube so as to form a core assembly, the intermediate cladding tube having an inner diameter and an outer diameter, wherein the inner diameter is larger than the core rod diameter, the radial difference between the inner diameter and the core rod diameter defining an annular gap; and applying a negative pressure inside the annular gap; and forming a core preform by heating the core assembly to collapse the intermediate cladding tube around the core rod while maintaining the negative pressure, wherein heating includes moving a heater outside the intermediate cladding tube and along an axial direction of the same, and forming an overcladding region surrounding the core preform so as to form an optical fiber preform.

15 Claims, 4 Drawing Sheets

(56) References Cited

U.S. PATENT DOCUMENTS

| | | | |
|---|---|---|---|
| 5,658,363 A * | 8/1997 | Ince et al. .................. 65/412 |
| 6,105,396 A | 8/2000 | Glodis et al. |
| 6,130,974 A | 10/2000 | Rivoallan |
| 6,422,042 B1 | 7/2002 | Berkey |
| 6,584,808 B1 | 7/2003 | Roba et al. |
| 7,164,835 B2 | 1/2007 | Matsuo et al. |
| 2002/0144521 A1 | 10/2002 | Orcel et al. |
| 2003/0145630 A1 * | 8/2003 | Hirano et al. ............... 65/412 |
| 2004/0099013 A1 * | 5/2004 | Fleming et al. ............. 65/382 |
| 2004/0139765 A1 * | 7/2004 | Hirano et al. ............... 65/412 |
| 2006/0039665 A1 * | 2/2006 | Matsuo et al. .............. 385/127 |
| 2008/0260339 A1 | 10/2008 | Barish et al. |
| 2010/0189400 A1 | 7/2010 | Sillard et al. |
| 2012/0087625 A1 * | 4/2012 | Han et al. .................. 385/124 |

FOREIGN PATENT DOCUMENTS

| | | |
|---|---|---|
| CN | 1727295 A | 2/2006 |
| CN | 101585658 A * | 11/2009 |
| EP | 0 718 244 A2 | 6/1996 |
| EP | 0 972 752 A1 | 1/2000 |
| EP | 1 440 947 A1 | 7/2004 |
| EP | 1 785 754 A1 | 5/2007 |
| EP | 1 788 411 | 5/2007 |
| EP | 1 845 399 A1 | 10/2007 |
| EP | 2 211 211 | 7/2010 |
| FR | 2 766 584 | 1/1999 |
| WO | WO 2012/084050 A1 | 6/2012 |

OTHER PUBLICATIONS

ITU-T, G 652, "Characteristics of a Single-Mode Optical Fibre and Cable," ITU-T Recommendation G.652, pp. i-iii and 1-13, (2003).

International Search Report from the European Patent Office for International Application No. PCT/EP2010/070646, mailed Sep. 23, 2011.

Written Opinion of the International Searching Authority for International Application No. PCT/EP2010/070648, mailed Sep. 23, 2011.

* cited by examiner

METHOD OF MANUFACTURING AN OPTICAL FIBRE GLASS PREFORM

CROSS REFERENCE TO RELATED APPLICATION

This application is a national phase application based on PCT/EP2010/070648, filed Dec. 23, 2010, the content of which is incorporated herein by reference.

FIELD OF THE INVENTION

The present invention relates to a method of manufacturing an optical fibre glass preform, in particular of manufacturing a glass preform to produce an optical fibre comprising a fluorine-doped intermediate cladding region.

BACKGROUND OF THE INVENTION

A class of fluorine-doped optical fibres has been tailored to fibre-to-the-premises (FTTP) applications, including fibre-to-the-home (FTTH) and fibre-to-the-building (FTTB) applications, which generally require low bending loss of optical signals transmitted through the fibres, also under stringent installation constraints that may impose tight bend radii, e.g., due to sharp cornering in buildings or compression of optical fibres. Optical transmission fibres designed for FTTP applications are in general required to meet the criteria of standardized recommendations that define single-mode fibres with enhanced bending performance, in particular the G.657 standard laid down by the International Telecommunications Union, ITU Telecommunication Sector (ITU-T).

Optical fibers having low bending loss may be obtained by fluorine-doping a region surrounding the fiber core, in order to suitably shape the refractive index profile.

A fluorine-doped single-mode optical fibre which is said to conform to the ITU-T G.652 specification standard and having an annular ring region of low relative refractive index of less than $-3 \times 10^{-3}$ is disclosed in EP 1 785 754. The described fibre is said to be preferably made by chemical a vapour deposition technique, specifically by Plasma Chemical Vapour Deposition (PCVD).

The incorporation of fluorine into a preform for optical fibre can be obtained by chemical vapour deposition (CVD) methods (such as modified CVD, MCVD; plasma CVD, PCVD; plasma enhanced CVD, PMCVD; outside vapour deposition, OVD; vapour axial deposition, VAD), typically employing fluorine precursors (e.g. $SiF_4$, $SF_6$, $C_2F_4$). Such methods require special plants and safety practice due to the presence of fluorine containing fluids.

A known alternative method to produce a fluorinated glass preform for use in the fabrication of a single-mode optical fibre is the so-called rod-in-tube (RIT) method, also known as "sleeving method". For example, U.S. Pat. No. 4,846,867 concerns an RIT method for producing a primary glass preform by inserting a core rod in a glass tube made of quartz glass added with fluorine and collapsing the glass tube into the rod. In particular, U.S. Pat. No. 4,846,867 sets forth that during heating, the inner wall of the glass tube and the outer surface of the core rod are kept clean by gas phase etching with a halogen-containing compound. Subsequently, soot particles of $SiO_2$ are deposited and then the preform having the layer of $SiO_2$ particles is heated in an atmosphere comprising a fluorine-containing compound in a furnace.

As evidenced, for example, by U.S. Pat. No. 6,422,042, when a fluorine-doped silica tube is collapsed onto a germania-doped silica rod, the resultant interface between those two members can contain many seeds, and much of the resultant preform or blank produces unusable optical fibre. Seeds include defects such as bubbles and impurities that can produce attenuation in the resultant optical fibre.

In said U.S. Pat. No. 6,422,042, while the entire assembly is being heated, a centerline chlorine-containing gas is flowed into the first end of the tube and between the tube and the rod, and out of the second end of the tube. The tube collapse step can be performed in the same furnace in which the chlorine cleaning step occurs.

US 2008/0260339 discloses a method for making a depressed index cladding for the inner cladding of an optical fibre, wherein the fluorine doped inner cladding is made in two steps. A first step, using soot formation, produces the innermost portion of the inner cladding layer, preferably by vapour axial deposition (VAD), followed by a second step, using RIT, to complete the inner cladding layer. After assembly of the rod and tube the combination is fused in a furnace to produce the preform.

SUMMARY OF THE INVENTION

The Applicant faced the problem of manufacturing an optical fibre preform having a refractive index profile comprising a fluorine-doped intermediate cladding region, in which the fluorine-doped region is produced by collapsing a fluorine-doped intermediate cladding tube around a core rod.

In addition to the above-mentioned problem of possible contamination during the collapsing step, the Applicant has recognised that when heating a glass tube of relatively small thickness—such as the fluorinated glass tube to form an intermediate cladding—to soften and collapse around the core rod, defects at the glass/rod interface could arise. Said defects can be due, for example, to a premature collapse of the glass tube on the core rod, when the glass tube, at least in some positions along the glass tube length, is not yet sufficiently hot to melt with the core. An uneven heating distribution can cause defects, especially in view of the reduced thickness of the fluorine glass tube, possibly causing instability of the tube during heating, which may produce a non-uniform collapsing along the tube length and/or a uneven thickness of the resulting preform.

The Applicant has found that an optical fibre preform having a refractive index profile comprising a fluorine-doped intermediate cladding region can be produced without contaminants or defects (hereinafter referred to as seeds) by collapsing a fluorine-doped intermediate cladding tube around a core rod, the tube and the rod being spaced by a predetermined annular gap in which a negative pressure is applied, and the heating for the collapsing step is provided by a heater moving axially along the tube/rod assembly.

In particular, the Applicant has observed that if the annular gap is too small, the intermediate cladding tube leans onto the core rod at a temperature insufficient for a uniform and complete collapsing, thus producing seeds or even spoiling the final product. If the annular gap is too large, collapse onto the core rod does not correctly take place.

According to an aspect, the present invention is directed to a method of manufacturing an optical fibre preform comprising: producing a core rod having a core rod diameter; inserting the core rod into a glass fluorine-doped intermediate cladding tube so as to form a core assembly, the intermediate cladding tube having an inner diameter and an outer diameter, wherein the inner diameter is larger than the core rod diameter, the radial difference between the inner diameter and the core rod diameter defining an annular gap; applying a negative pressure inside the annular gap; forming a core preform by heating the core assembly to collapse the intermediate cladding tube around the core rod while maintaining the negative pressure, wherein heating comprises moving a heater outside the intermediate cladding tube and along an axial direction of the same, and forming an overcladding region surrounding the core preform so as to form an optical fibre preform.

Preferably, the width of the annular gap is of from 1 mm to 5 mm, more preferably of from 1.5 mm to 3 mm.

The inner and outer diameter of the fluorine-doped tube forming the fluorine-doped intermediate cladding region—in the following also referred to as the intermediate cladding tube—correspond, respectively, to an inner radius and an outer radius. The radial difference between the inner and outer radius defines a radial thickness. Preferably, the radial thickness of the intermediate cladding tube is of from 1 mm to 10 mm, more preferably of from 2 to 8 mm.

Preferably, in the fluorine-doped tube according to the process of the invention the radial thickness is of from 1/35 to 1/3.5 of the outer diameter, more preferably of from 1/17.5 to 1/4.4.

Preferably, moving the heater is at a traverse speed of from 20 mm/min to 40 mm/min, more preferably of from 25 to 35 mm/min.

Preferably, the heater is an oxygen/hydrogen burner. In some embodiments, the heater is a graphite induction furnace.

According to some preferred embodiments, because of the relatively small radial thickness of the fluorine-doped glass tube, the core preform can be produced by assembly and thermal collapse of the glass tube onto the core rod with a relatively fast process, thereby improving production efficiency, while ensuring a defect-free interface between the glass tube and the core rod.

In some embodiments, thermal collapse of the tube onto the core to produce a substantially smooth and defect-free core preform can be carried out in a single pass of the heater along the length of the tube.

The method according to the present invention is suitable for the fabrication of bend-insensitive single-mode transmission optical fibres having a fluorine-doped intermediate cladding conforming to the ITU-T standards, such as the G.652 and G.657 standards.

The method according to the invention makes possible to produce an optical fibre comprising an inner cladding doped with fluorine in a concentration such as to produce fluorine-doped intermediated cladding region of substantially negative refractive index.

BRIEF DESCRIPTION OF THE DRAWINGS

The present invention will be now described more fully hereinafter with reference to the accompanying drawings, in which some, but not all embodiments of the invention are shown. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

DETAILED DESCRIPTION

Figure 1:
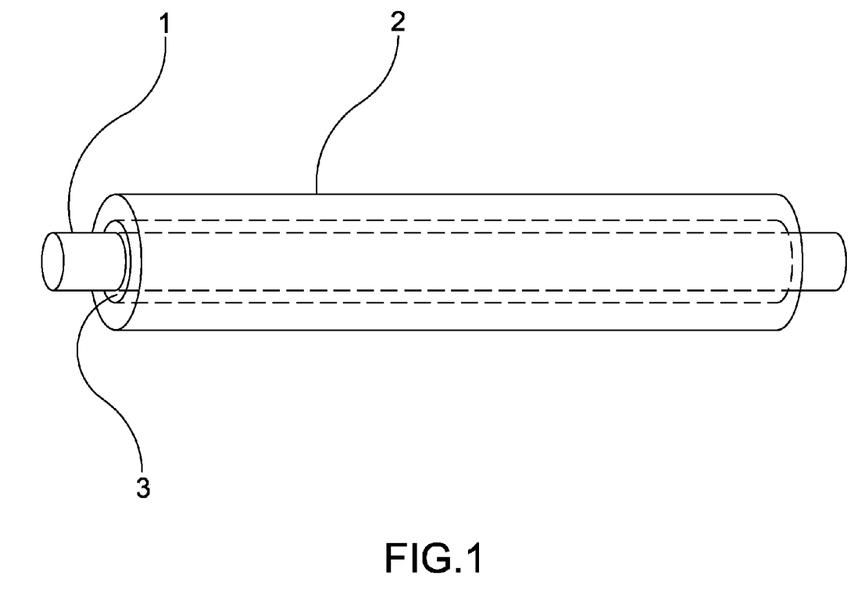
FIG. 1 is a perspective view of a rod-in-tube in which a core rod is arranged axially inside a glass tube.

FIG. 1 shows a perspective view of a rod-in-tube, in which a core rod 1 is inserted axially inside an intermediate cladding glass tube 2, positioned coaxially with the core rod. The core rod is preferably already consolidated. The intermediate cladding glass tube is doped with fluorine to provide a negative relative refractive index, typically with respect to undoped silica ($SiO_2$), in an intermediate cladding region of the refractive index profile. The glass tube 2 has an inner diameter that is larger than the diameter of the core rod so that an annular clearance gap 3 exists between the core rod 1 and the glass tube 2. The core rod and the intermediate cladding tube form a core assembly. The clearance gap 3 will be referred to as the annular gap and its radial width to as the gap width.

In some embodiments, before insertion of the core rod into the intermediate cladding tube, the core rod is cleaned in order to eliminate possible impurities that can be present on its external surface. Cleaning can be carried out by immerging the core rod in an aqueous solution containing HF. In some embodiments, at least the inner wall of the glass tube is chemically washed before formation of the core assembly.

Figure 2:
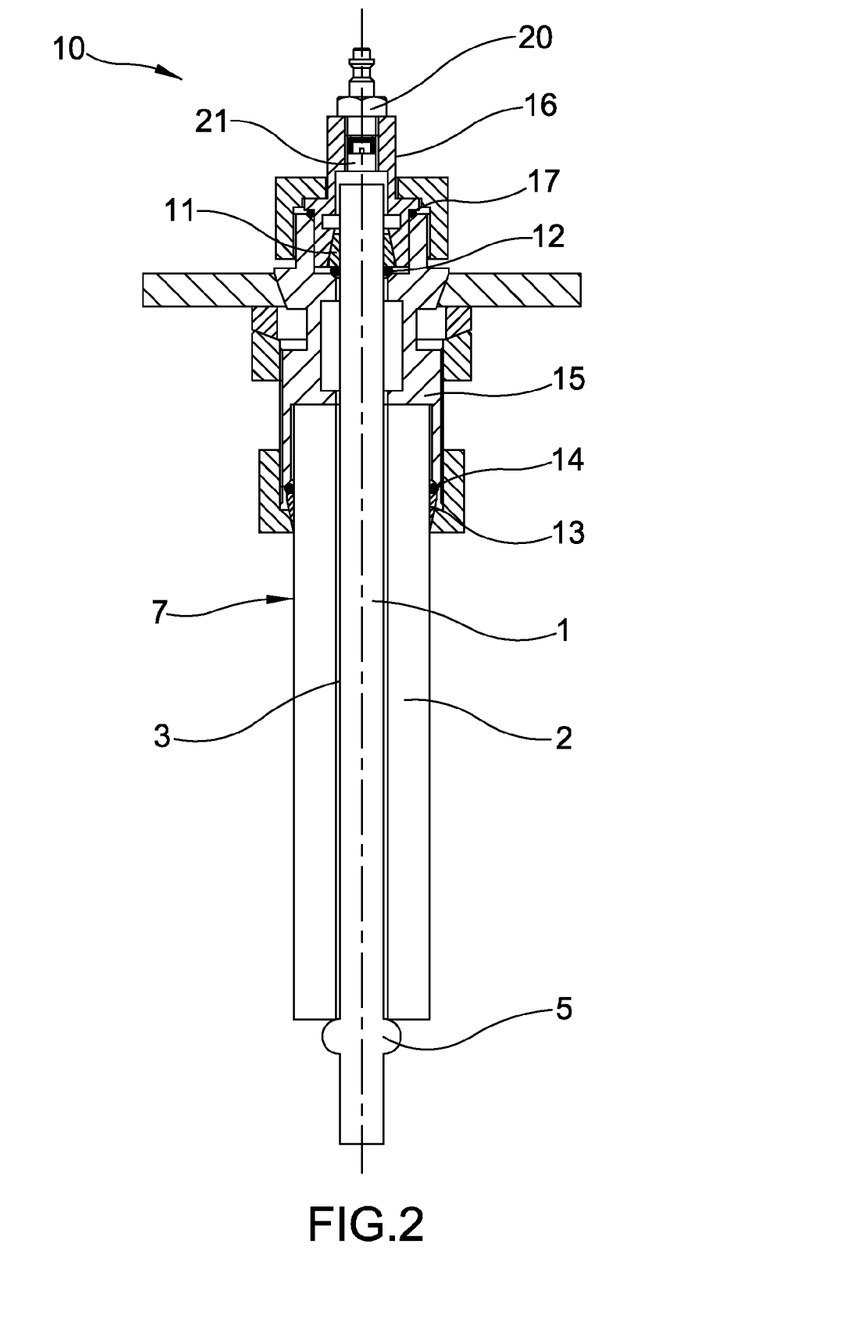
FIG. 2 is a cross-sectional view of a holding device fitting the rod-in-tube, according to an embodiment of the invention, for assembly of a core assembly during the formation of the core preform.

A holding device is mounted onto the core assembly for holding the core assembly at one end during heating and softening of the intermediate cladding glass tube onto the core rod. An example of a holding device suitable for the method of the present invention is shown in FIG. 2. For ease of understanding and not for purpose of limitation, the end of the core assembly fitted into the holding device will be referred to as the upper end, whereas the opposite end will be referred to as the lower end. In FIG. 2, a holding device 10 comprises a first split ring retainer 11, formed in a conventional way of radial segments. The first split ring retainer 11 is arranged around the core rod 1 and is forced inwardly by a ring nut (not illustrated) so as to grip a length portion of the core rod and to compress a first O-ring 12 adjacent to the split ring retainer 11. The core rod 1 has a length section protruding from the lower end of the glass tube 2. A portion of the protruding length section is shaped into a glass ball 5 and is positioned near the lower end of the glass tube, preferably at an axial position substantially corresponding to the end of the glass tube 2. The glass ball 5 has a diameter larger than that of the annular gap 3 (i.e. the glass ball diameter is larger than the inner diameter of the tube) to allow supporting of the core rod within the assembly and keeping the core rod 1 aligned within the glass tube 2. A second split ring retainer 13 is arranged around the glass tube and forced inwardly to grip the tube and to compress a second O-ring 14. For example, split ring retainers and O-rings can be made of polymeric materials, such as fluorocarbon materials.

A threaded metal body 15 holds in place split ring retainers 11 and 13 and O-rings 12 and 14. In addition, the threaded body 15 is engaged to a sealing cap 16 and an O-ring 17 is trapped between the threaded body 15 and the sealing cap. O-rings 14 and 17 hermetically seal the threaded body 15 and sealing cap 16 at the upper end portion of the core assembly.

The sealing cap 16 has a through-open channel 21 through which an inlet connector 20 is inserted and engaged in an airtight manner. The inlet connector 20 places in communication the annular gap 3 of the core assembly 7 with a vacuum source, for example a conventional vacuum pump by means of a suction duct (not shown).

The core rod is concentrically positioned within the glass tube. The holding device 10 is apt to centralise one end of the core rod within the glass tube and thus to concentrically position the core rod within the tube.

The core assembly 7 fitted into the holding device 10 is mounted on a sleeving apparatus suitable for carrying out the step of heating the intermediate cladding tube to collapse the tube around the core rod and form a core preform.

Figure 3:
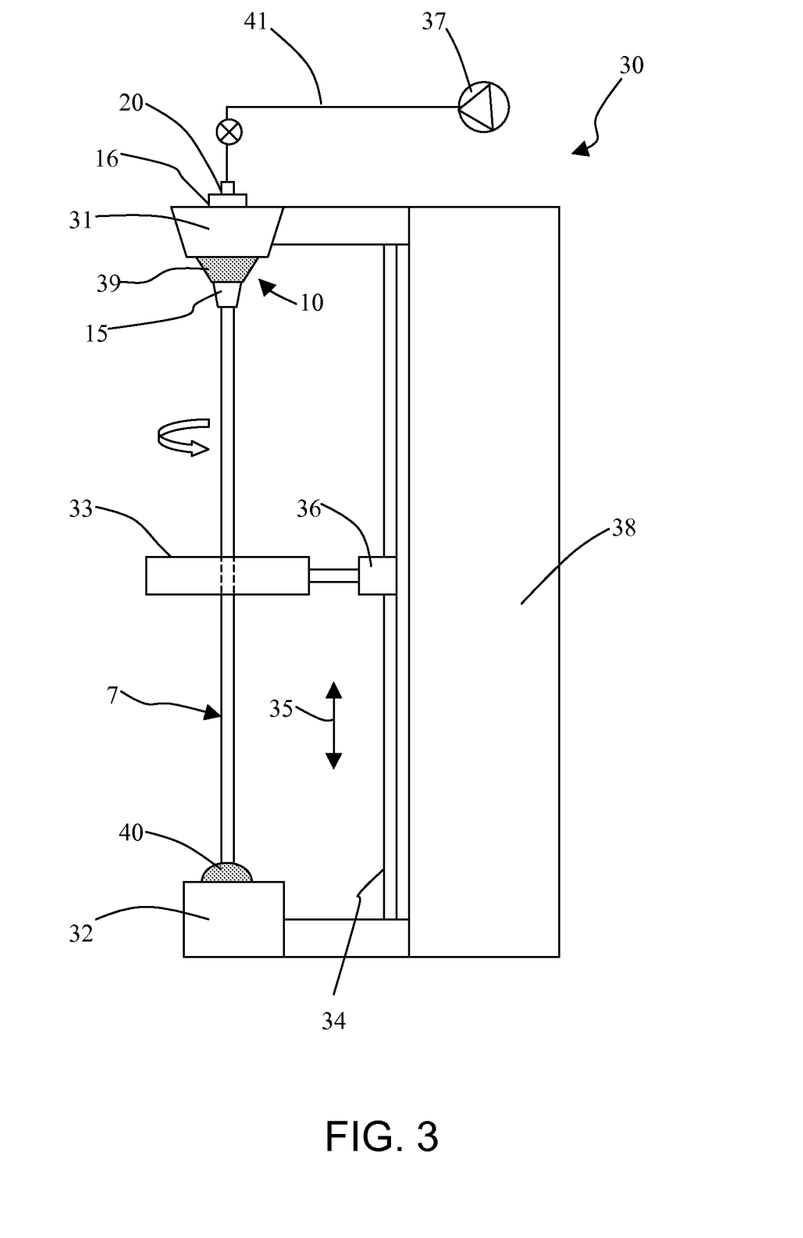
FIG. 3 is a cross-sectional view of an apparatus for producing a core preform, according to an embodiment of the invention.

FIG. 3 is a diagram of a vertical sleeving apparatus 30 for carrying out the process of collapsing the intermediate cladding tube onto the core rod, according to an embodiment of the invention. The holding device 10 (only part of it is visible in FIG. 3) fitting the upper end of the core assembly is clamped in an upper chuck 39 supported by a headstock 31 of the apparatus 30. The upper chuck 39 engages with the threaded body 15 of the fitting device 10 (only partly visible in FIG. 3) in such a way that the longitudinal axis of the core assembly extends vertically. The lower end of the core assembly is clamped in a lower chuck 40 supported by a tailstock 32 by engaging the lower end of the glass tube. Preferably, each chuck 39 and 40 comprises a rotational unit (not shown) that enables the core assembly to rotate about its longitudinal axis, preferably to uniformly rotate.

A heater 33 is apt to traverse the length of the core assembly 7 along a guide so that discrete length portions of the core assembly are heated. For example, the heater 33 is mounted on a carriage 36 movable, by means of a conventional motor, along a guide shaft 34. The heater carriage is made to traverse at a predetermined speed the outer surface of the intermediate cladding tube along an axial direction of the same.

The heater heats the fluorine-doped intermediate cladding tube at a temperature above the softening point of the glass forming the intermediate cladding tube, e.g. approximately of 1,900° C. for silica glass. As the glass softens, the tube starts collapsing onto the core rod. Preferably, the heater heats the intermediate cladding tube at a temperature of from 1,800° C. to 2,000° C.

When the core assembly is held in place in the sleeving apparatus, a suction duct 41 is connected to the connector 20 to form a connection with a vacuum pump 37. The tight seal provided by the sealing cap 16 and O-rings is maintained during rotation of the core assembly.

At the beginning of the process, the burner is placed in correspondence of a lower length section at the lower end of the core assembly (e.g. near the lower chuck 40) and it is turned on to thermally collapse the tube onto the rod such that at least a portion of the length section of the glass tube melts around the rod to form a seal at the lower end of the core assembly. By sealing an end of the core assembly and connecting the other end to a vacuum source, a negative pressure is applied through the annular gap of the core assembly. Preferably, the negative pressure is of from 0.2 bar to 0.9 bar, more preferably from 0.4 to 0.7 bar.

Thereafter, the burner is moved upwardly from the initial position at the lower end of the core assembly to traverse the length of the same. To complete collapse of the fluorine-doped intermediate cladding tube, the heater can be moved in a plurality of passes, preferably along a first axial direction (e.g. upwardly) and a second axial direction opposite to the first axial direction (e.g. downwardly), indicated in the figure with double arrow 35.

The thermal collapse of the intermediate cladding tube can be achieved with a single pass of the heater along the length of the tube.

Application of a negative pressure through the annular gap between the core rod and the intermediate cladding tube at least partially evacuates the annular gap and assists the formation of a defect-free interface between the core rod and the tube. The produced core preform exhibits a smooth interface with very low defect density that allows the fabrication of a single-mode optical fibre having optical attenuation that is compliant to the ITU-T G.652 standard.

According to some preferred embodiments, the heater is an annular heater (only schematically shown in FIG. 3) arranged in such a way that, when the core assembly is clamped in place in the sleeving apparatus, is circumferentially spaced apart from the intermediate cladding tube. The core assembly is arranged in such a way that it extends vertically through the annular heater.

The radial thickness of the fluorine-doped intermediate cladding tube is relatively small, preferably of from 1 mm to 10 mm, more preferably of from 2 mm to 8 mm. In general the radial thickness is selected according to the desired width of the intermediate cladding region of the optical fibre fabricated from the optical fibre preform.

Preferably, the radial thickness of intermediate cladding tube is of from 1/35 to 1/3.5 of its outer diameter, more preferably of from 1/17.5 to 1/4.4 of its outer diameter.

The Applicant has observed that, due to the relatively small radial thickness of the intermediate cladding tube, if the traverse speed of the heater is too high, seeds could be formed at the interface tube/core rod during thermal collapse of the tube onto the rod. In particular, in some embodiments, it has been observed that if the traverse speed is higher than about 40 mm, a significant density of seeds, especially bubbles, was visible at the interface tube/core rod during and after thermal collapsing of the tube onto the rod. Reduction of traverse speed produces core preforms with no seed formation at the interface tube/core rod.

Preferably, the heater traverses the intermediate-cladding tube at a speed of from 20 to 40 mm/min, more preferably from 25 to 35 mm/min.

Preferably, the core assembly is rotated at a rotating speed of from 3 to 10 rpm while heating the intermediate cladding tube.

Preferably, the gap width is of from 1 mm to 5 mm, more preferably of from 1.5 mm to 3 mm.

Although the embodiment of FIG. 3 relates to a vertical sleeving apparatus, the present invention can comprise a method of forming a core preform by using a horizontal sleeving apparatus. In an embodiment (not shown in the figures), the core assembly is mounted on a horizontal sleeving apparatus suitable for carrying out the step of heating the intermediate cladding tube to collapse the tube around the core rod and to form a core preform. An annular graphite induction furnace is apt to traverse the length of the core assembly mounted on the horizontal sleeving apparatus so that discrete length portions of the core assembly are heated. The core assembly is arranged in such a way that it extends horizontally through the induction furnace. For example, the induction furnace is mounted on a carriage movable, by means of a conventional motor, along a guide shaft. Heating comprises moving the induction furnace at least along an axial direction of the core assembly. The furnace can move in a plurality of passes along opposite axial directions before completion of the collapse of the tube onto the rod.

After formation of the core preform, an overcladding region is formed around the core preform to produce an optical fibre preform.

Preferably, the overcladding region is prepared by a soot deposition method, wherein, first, silica soot is deposited about the core preform and, second, the core preform coated with the soot is subjected to a temperature above the glass transition temperature to consolidate the soot and for an optical fibre preform. In some embodiments, the overcladding region is produced by an Outside Vapour Deposition (OVD) process, in a manner per se known, wherein deposition is based on flame combustion wherein silica precursors, such as $SiCl_4$, are fed together with combusting gases through a deposition burner which directs a high temperature flow of forming fine and correct glass soot particles onto a rotating growing target around the core preform. The growth of the preform takes place in a radial direction by repeatedly moving a burner along the surface of the growing preform.

Optionally, before the formation of the overcladding, the core preform is stretched to reduce its outer diameter.

The optical fibre fabricated from the optical fibre preform showed no defects at the interface between the core region corresponding to the core rod and the intermediate cladding region. The core rod comprises a central core region doped with an increasing-refractive index dopant, such as germanium. In some preferred embodiments, the core rod comprises a central core region and at least one inner cladding region. The core rod can be fabricated in any of the vapour deposition methods known in the art, such as Vapour Axial Deposition (VAD), Plasma Chemical Vapour Deposition (PCVD), Outside Vapour Deposition (OVD) or Modified Chemical Vapour Deposition (MCVD), Furnace Chemical Vapour Deposition (FCVD).

Preferably, the core rod is produced by using an inside tube deposition process. According to some preferred embodiments, the inside tube deposition process is a Modified Chemical Vapour Deposition (MCVD) process.

Figure 4:
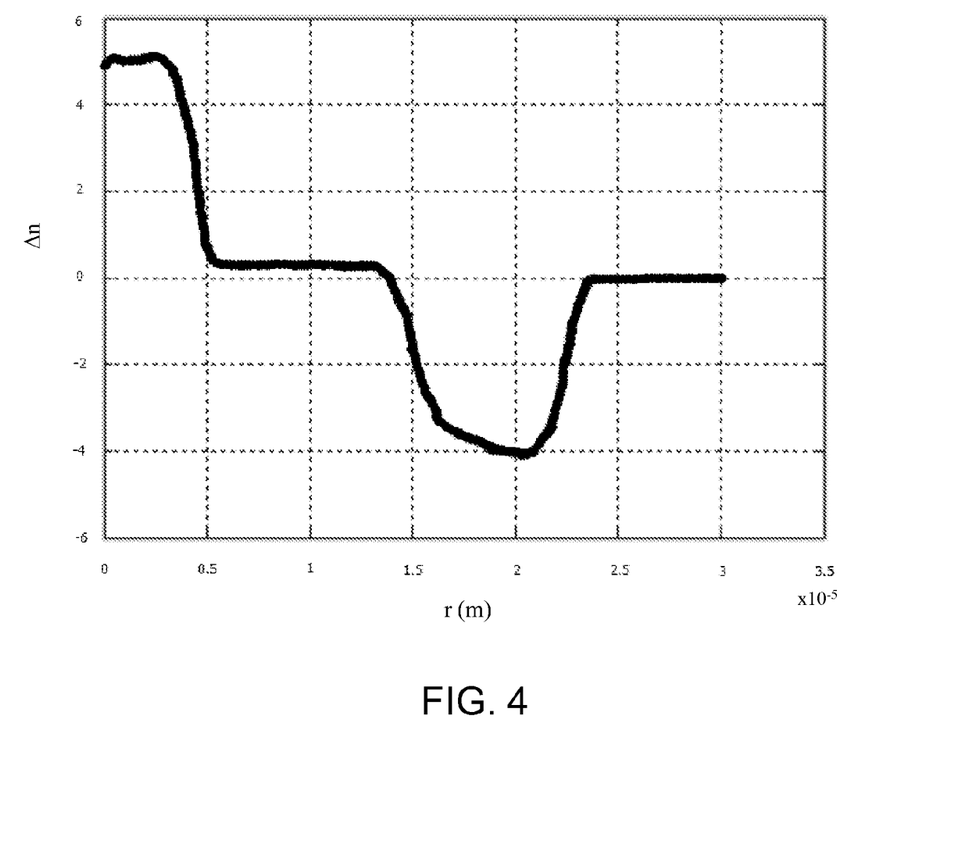
FIG. 4 is a graph reporting the relative refractive index profile ($\Delta n$) of an optical fibre preform, according to an embodiment of the present invention.

FIG. 4 show an example of refractive index profile of an optical fibre that can be produced by the method of the invention. The relative refractive index profile of the depressed region is of about $-4.2 \cdot 10^{-3}$.

EXAMPLE

A hollow cylindrical substrate tube made of pure silica and having a radial thickness of 2.5 mm was mounted onto a MCVD horizontal lathe. A gaseous mixture comprising soot-forming reagent chemicals was flown into the cylindrical cavity of the substrate tube Concurrently to gaseous mixture injection into the substrate tube, the substrate tube was continuously rotated and its outside surface was heated by traversing a flame along the outside surface in a plurality of passes along opposite axial directions at a temperature of about 1950° C. First, an inner cladding was produced by flowing a gasous mixture comprising $SiCl_4$ and $O_2$ and, second, the guiding core was produced by flowing a gasous mixture comprising $SiCl_4$, $GeCl_4$ and $O_2$. The resulting core rod comprised a germanium-doped core region and an inner cladding region surrounding the core region of undoped silica ($SiO_2$).

The solid core rod of germanium-doped silica was removed from the MCVD lathe to be inserted into an intermediate-cladding glass tube made of silica doped with fluorine at a concentration approximately constant which provided a relative refractive index to pure silica of $-3.4 \cdot 10^{-3}$, corresponding to a fluorine concentration of about 7%. The tube length was of 1000 mm. The inner diameter of the tube was of 23 mm and the outer diameter of 29 mm and thus the tube had a radial thickness of 3 mm.

Collapse of the intermediate cladding tube into the rod was made mounting the core assembly in a sleeving apparatus such as that shown in FIG. 3 with an upper end of the core assembly connected to a vacuum pump. An annular oxygen/hydrogen burner was positioned at a lower length section of the intermediate cladding tube near the lower end of the core assembly. The burner was turned on to generate an annular flame of oxygen flow rate of 25 slpm and hydrogen flow rate of 60 slpm. At the beginning of the process, the flame traversed the lower length section of the intermediate cladding tube so as to seal the tube onto the core rod in correspondence to this length section. Once the lower end of the tube was closed onto the core rod, the vacuum pump created a negative pressure through the annular gap of the assembly of about 0.6 bar. Then the burner travelled upwardly along the glass tube at a speed of 35 mm/min to soften and collapse the tube around the rod. After a single pass of the burner, the intermediate cladding tube thermally collapsed onto the rod to create a core preform of about 27 mm of diameter. During operation of the burner, the core assembly was rotated of 5 rpm.

The core preform was stretched to reduce its diameter. To this end, the core preform was fitted in a horizontal movable lathe and an oxygen/hydrogen burner set at a glass softening temperature was made to traverse the length of the core preform in an axial direction while the movable lathe moved along the same axial direction at a lower speed than that of the burner. The final diameter of the stretched preform was obtained by setting the ratio between the lathe speed and the burner speed, in a way per se known. The diameter of the stretched preform was of about 24 mm.

The core preform was then mounted on an OVD lathe and silica soot was deposited on the rotated mandrels by a standard OVD process. The soot deposition was continued until the sought weight for the formation of an overcladding region was obtained. The soot porous preform was then sintered in a furnace kept at 1550° C. while introducing He gas and $Cl_2$ gas in a ratio of 95:5. The consolidated optical fibre preform had an outer diameter of 80 mm.

The optical fibre preform was moved to a drawing tower and drawn at a temperature of 2000-2100° C. to fabricate a single-mode optical fibre of outer diameter of about 125 µm.

The refractive index profile of the optical fibre fabricated according to the method of the example comprises a germanium-doped central core region of relative refractive index of $5.5 \cdot 10^{-3}$ with respect to the overcladding region that was made of undoped silica, a inner cladding region having a relative refractive index of about $0 \cdot 10^{-3}$ (substrate tube) and a fluorine-doped intermediate cladding region having a negative relative refractive index of about $-3.4 \cdot 10^{-3}$. An overcladding region of undoped silica surrounded the intermediate cladding region.

The invention claimed is:

1. A method of manufacturing an optical fibre preform comprising:
   producing a core rod having a core rod diameter;
   inserting the core rod into a glass fluorine-doped intermediate cladding tube so as to form a core assembly having a length, the intermediate cladding tube having an inner diameter and an outer diameter, wherein the inner diameter is larger than the core rod diameter, the radial difference between the inner diameter and the core rod diameter defines an annular gap, and the intermediate cladding tube has a radial thickness of 1 mm to 10 mm;
   arranging the core assembly in such a way that the core assembly extends vertically;

applying a negative pressure inside the annular gap;

forming a core preform by heating the core assembly to collapse the intermediate cladding tube around the core rod while maintaining the negative pressure, wherein heating comprises moving a heater outside the intermediate cladding tube at a traverse peed of 20 mm/min to 40 mm/min and along an axial direction at least upwardly of the intermediate cladding tube initially from a position at one end of the core assembly to traverse the length of the same, and in a plurality of passes along opposite axial directions; and forming an overcladding region surrounding the core preform so as to form an optical fibre preform.

2. The method of claim 1, wherein the annular gap has a gap width of 1 to 5 mm.

3. The method of claim 1, wherein the heater is an annular heater circumferentially spaced apart from the intermediate cladding tube, and the core assembly is arranged in such a way that the core assembly extends vertically through the annular heater.

4. The method of claim 1, further comprising, concurrent with heating, uniformly rotating the core assembly.

5. The method of claim 1, wherein the heater is a burner that generates a flame at a temperature above a glass softening point temperature.

6. The method of claim 1, wherein the heater is selected from an oxygen/hydrogen burner and an induction furnace.

7. The method of claim 1, wherein the intermediate cladding tube has a radial thickness that is 1/35 to 1/15 of the outer diameter.

8. The method of claim 1, wherein the glass fluorine-doped inner cladding tube is doped with fluorine across a radial thickness thereof.

9. The method of claim 1, wherein applying a negative pressure comprises:
sealing a first end of the core assembly, and
connecting a second end of the core assembly to a vacuum source.

10. The method of claim 1, wherein the negative pressure is 0.1 bar to 0.9 bar.

11. The method of claim 1, wherein producing a core rod uses an inside tube soot deposition process and comprises:
providing a hollow substrate tube having an inside surface facing a cylindrical cavity and an outside surface;
depositing glass onto the inside surface of the hollow substrate tube by injecting a gaseous mixture comprising soot-forming reagent chemicals into the cylindrical cavity; and
concurrently with depositing, heating the outside surface of the hollow substrate tube by moving a heater along the outside surface in a plurality of passes along opposite axial directions.

12. The method of claim 11, wherein the inside tube soot deposition process is a modified chemical vapour deposition process.

13. The method of claim 1, wherein forming an overcladding region comprises depositing glass soot onto an outside surface of the core preform and consolidating the glass soot by heating the core preform coated with the glass soot at a temperature above the glass transition temperature.

14. The method of claim 13, comprising depositing glass soot by outside vapour deposition.

15. A method of manufacturing an optical fibre comprising:
producing a core rod having a core rod diameter;
inserting the core rod into a glass fluorine-doped intermediate cladding tube so as to form a core assembly having a length, the intermediate cladding tube having an inner diameter and an outer diameter, wherein the inner diameter is larger than the core rod diameter, the radial difference between the inner diameter and the core rod diameter defines an annular gap, and the intermediate cladding tube has a radial thickness of 1 mm to 10 mm;
arranging the core assembly in such a way that the core assembly extends vertically;
applying a negative pressure inside the annular gap;
forming a core preform by heating the core assembly to collapse the intermediate cladding tube around the core rod while maintaining the negative pressure, wherein heating comprises moving a heater outside the intermediate cladding tube at a traverse speed of 20 mm/min to 40 mm/min and along an axial direction at least upwardly of the intermediate cladding tube initially from a position at one end of the core assembly to traverse the length of the same, and in a plurality of passes along opposite axial directions;
forming an overcladding region surrounding the core preform so as to form an optical fibre preform; and
drawing the optical fibre preform to fabricate an optical fibre.

* * * * *